Feb. 23, 1932.  C. F. UHDEN ET AL  1,846,699

RELIEF FAUCET

Filed May 16, 1929

INVENTORS
Carl F. Uhden
Henry E. Schultheis
Lorne M. Barringer

Harry Bowen
ATTORNEY

Patented Feb. 23, 1932

1,846,699

UNITED STATES PATENT OFFICE

CARL F. UHDEN, HENRY E. SCHULTHEIS, AND LORNE M. BARRINGER, OF SEATTLE, WASHINGTON; SAID UHDEN AND SAID SCHULTHEIS ASSIGNORS TO SAID BARRINGER

RELIEF FAUCET

Application filed May 16, 1929. Serial No. 363,425.

The invention is a faucet with a relief valve incorporated therein which will automatically open the faucet when the pressure of a fluid connected to the faucet reaches a predetermined degree, and is particularly adaptable for independent systems having individual hot water heaters that raise the temperature and pressure of the water and sometimes blow out the connections.

The object of the invention is to provide means in a faucet which will automatically open the faucet as the pressure of the fluid which is connected to the faucet, reaches a predetermined degree.

Another object of the invention is to provide a water faucet that will automatically blow off as the pressure therein reaches a predetermined degree.

Another object of the invention is to provide a relief valve for water faucets which is constantly in operation so that it will not stick or become inoperative for lack of use.

Another object of the invention is to provide means for inserting a relief valve in combination with a water faucet in which the relief valve is exposed and readily accessible.

Another object of the invention is to provide a relief valve for water faucets which may be used with any type of faucet.

A further object of the invention is to provide a relief faucet in which the pressure at which the faucet opens may readily be adjusted.

And a still further object of the invention is to provide a faucet which will automatically open when the pressure of a fluid to which it is connected reaches a predetermined degree, which is of a simple and economical construction.

With these ends in view the invention embodies a faucet in which the valve is resiliently held in the closed position and forced away from its seat by screwing the stem inward, in which the valve is so arranged that it will open when the pressure of the fluid to which the valve is connected reaches a predetermined degree.

Other features and advantages of the invention will appear from the following description taken in connection with the drawings, wherein.

Figure 1:
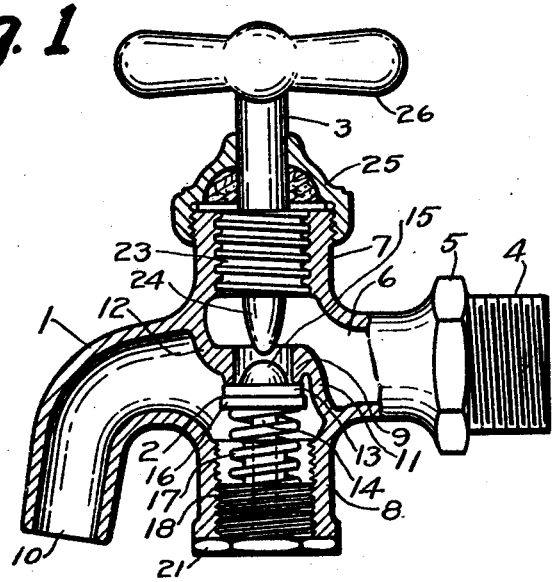
Figure 1 is a longitudinal section through the faucet.
Figure 2:
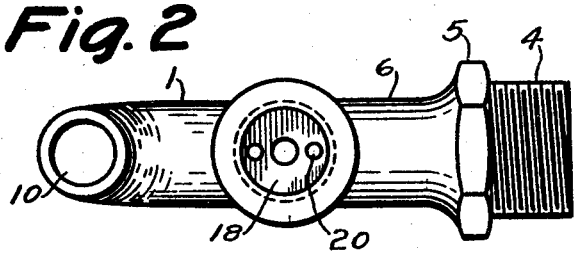
Figure 2 is a view looking toward the under side of the faucet with the holding nut below the valve omitted.

In the drawings the device is shown as it would be made wherein numeral 1 indicates the valve casing, numeral 2 the valve, and numeral 3 the valve stem.

The casing 1 may be of any suitable design and may be arranged in any suitable manner. The valve may also be of any suitable design and may be arranged in the casing in any suitable manner, and the valve casing may be provided with any suitable means for operating the valve. In the design shown the casing is made with a threaded shank 4 having a nut 5 at the end thereof by which it may be screwed into a pipe or fitting, and from the nut 5 the casing extends with a tubular section 6 to vertical sections 7 and 8 with a valve seat 9 between them. Another tubular section extends outward and downward from the opposite side of the vertical sections forming the discharge tip 10. The valve seat 9 is positioned approximately in the center of the casing with a continuous web 11 connecting one side thereof to the lower portion of the casing, and another continuous web 12 connecting the opposite side thereof to the upper surface of the casing.

Figure 3:
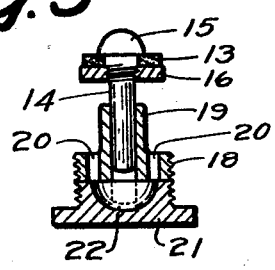
Figure 3 is a detail showing a cross section through the valve member.

The valve 2 is formed with a disc 13 mounted upon a stem 14 having a head 15, and held in place by a nut 16 which is threaded on the stem as shown. The disc 13 may be made of fibre, metal, or of any suitable material. The valve is resiliently held against the seat 9 by a spring 17 the opposite end of which bears against a disc 18 which is screwed into the vertical tubular section 8 of the casing. The disc 18 is provided with a sleeve 19 that extends upward to form a guide for the stem 14, and is also provided with openings 20 by which it may be rotated to screw it inward or outward to adjust the tension of the spring 17. Below the disc 18 is a nut 21 having a recess 22 on the interior thereof to provide clearance for the lower end of the stem 14 as it moves downward to the position shown in dotted lines in Figure 3.

The stem 3 is provided with an enlarged threaded section 23 that screws into the vertical tubular section 7 of the casing 1 and below the section 23 the stem forms a point 24 which engages the head 15 to force the valve 13 downward when the stem 3 is screwed downward to manually open the valve. It will be noted that by arranging the valve in this manner the relief valve may be operated every time the faucet is opened so that it will not stick or become inoperative from lack of use, as often happens with relief valves of other types. The upper end of the section 7 is provided with a nut 25 forming a packing gland to seal the upper end of the section and the upper end of the stem 3 may be provided with a handle 26 which may be of any suitable type or design. It is understood that although the stem 3 is shown as being operated to screw inward as it is turned to open the valve, it may be arranged in any other suitable manner, as it will be appreciated that many other designs of faucets and of means for opening the faucets by forcing the valves away from the seats, are in use, and the relief device may be used in combination with any of them.

Figures 4, 5:
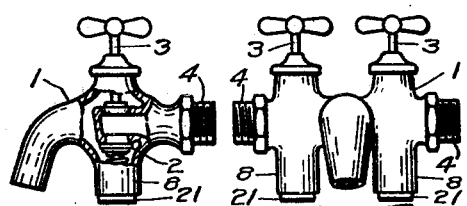
Figure 4 is a view showing a faucet with the manual and relief valves independent of each other.
Figure 5 is a view showing a twin faucet.

Although the device is shown in combination with a single faucet, it is understood that it may also be used with double or twin faucets, as shown in Figure 5, and although the relief valve is shown as a part of the faucet valve it will be understood that the relief valve may be inserted in the faucet or used in combination therewith and be independent of the faucet valve, as shown in Figure 4, so that the faucet valve may be operated without operating the relief valve. By using a relief valve in a faucet it makes it possible to locate the relief valve in such a position that it is in a convenient location and at all times readily accessible, as it may be necessary to adjust the tension thereof or repair it.

It will be understood that other changes may be made in the construction without departing from the spirit of the invention. One of which changes may be in the use of a valve of any other type, another may be in the use of other means for holding the valve closed, and still another may be in the use of other means for adjusting the tension of the valve.

The construction will be readily understood from the foregoing description. In use the device may be provided as shown and the faucet may be connected to a fitting, container, or any suitable device, and it will be observed that should the pressure of the fluid in the container reach a predetermined amount it would force the valve 13 downward so that it will open the valve and relieve the pressure until the pressure is lowered sufficiently to permit the spring to close the valve. It will be noted that this is not only a safety device to prevent blowing up the system but provides a warning, as it indicates that the heater or other device has been left on or is too hot. It will also be noted that although this device is shown and described as a faucet for water systems it may be used for many other purposes.

Having thus fully described the invention, what we claim as new and desire to secure by Letters Patent, is:

A valve comprising a casing having inlet and outlet ports, a traverse partition with an opening therein separating the said inlet and outlet ports, a valve seat in the said partition, said casing having tubular nipples extending upward and downward therefrom and in axial alignment with the opening in the said partition, a valve member having a downwardly extending stem engaging the valve seat of the said partition, a nut threaded in the downwardly extending nipple and forming a guide for the said valve stem, a spring around the said valve stem engaging the valve member at one end and the nut at the other, said nut adapted to be turned inward or outward to adjust the tension on the said spring, a cap also threaded in the said downwardly extending nipple and forming a closure for the lower end thereof, and a pin threaded in the upwardly extending nipple and adapted to be screwed downward to engage the said valve member to force it away from the seat to open the valve.

In testimony whereof they affix their signatures.

CARL F. UHDEN.
HENRY E. SCHULTHEIS.
LORNE M. BARRINGER.